United States Patent [19]

Ueda

[11] Patent Number: 5,015,076
[45] Date of Patent: May 14, 1991

[54] PROJECTION LEWS FOR A PROJECTOR

[75] Inventor: Kiichirou Ueda, Hachioji, Japan

[73] Assignee: Konica Corporation, Tokyo, Japan

[21] Appl. No.: 340,650

[22] Filed: Apr. 20, 1989

[30] Foreign Application Priority Data

Sep. 2, 1988 [JP] Japan .................................. 63-218476
Dec. 21, 1988 [JP] Japan .................................. 63-320706

[51] Int. Cl.$^5$ ........................... G02B 3/02; G02B 9/64
[52] U.S. Cl. .................................... 350/412; 350/432; 350/463
[58] Field of Search ........................ 350/412, 432, 463

[56] References Cited

FOREIGN PATENT DOCUMENTS 106427 4/1987 Japan .
85212 5/1987 Japan .

Primary Examiner—Bruce Y. Arnold
Assistant Examiner—Rebecca D. Gass

[57] ABSTRACT

A projection lens for a projector according to the present invention comprises, in order from the screen side, the first lens unit including at least one positive lens and negative lens, the positive second lens including at least one negative lens and positive lens, and the negative third lens unit with a concave surface having a large curvature directed at the screen side, the first lens unit merely comprising spherical lens elements, at least one of the negative lenses in the first lens unit having a concave surface of larger curvature directed at an adjacent convex surface at the object side (CRT side), the second lens unit or the third lens unit having at least one or more aspherical surfaces. Thereby, an image quality of high definition as in a high quality television is realized without employing an aspherical surface is a portion where error in fabrication affects greatly aberrations due to the aperture, the affection tending to occur when an aspherical lens is used in the first lens unit.

9 Claims, 7 Drawing Sheets

PROJECTION LEWS FOR A PROJECTOR

BACKGROUND OF THE INVENTION

1. Field of the Invention

This invention relates to a projection lens for a projector, and more particularly to a bright projection lens of high definition which is suitable for a projection lens for a television projector of high quality.

2. Description of the Prior Art

A television projector is designed so that a picture plane of a cathode ray tube is enlarged and projected on a screen by a projection lens as is known. A demand of such a projector has been recently increased not only for business use but also for home use and the wide-use thereof has been expected. With this trend, projector devices of more compact size and lower cost have been greatly desired. A projector lens also becomes necessary to have a large aperture ratio, approximately 1:1.2, and an extremely wide angle.

On the other hand, a sign now appears in which a so-called high quality television having a resolution equal to that of a 35 mm movie has been put to practical use mainly for business use, and expected to come into wide use for home use. Under these circumstances, also in the television projector, the demand toward the high quality of image is particularly high, and the image quality of high definition as seen in the high quality television has been desired also for the television projector.

Projector lenses in an attempt of obtaining an image quality of high definition in response to such a demand as described are disclosed as examples thereof in unexamined published Japanese Patent Application Nos. 106427/1987, 85212/1987 and so forth. In these lenses, as can be seen in their examples, an aspherical lens in used for the first lens unit whereby the spherical aberration, the coma and the like due to the aperture are corrected.

Actually, however, the technique for preparing aspherical lenses has not yet been established, and it is very difficult to prepare them even at present. Further, even in the case where an aspherical lens formed from plastic which is relatively simply worked is used, the environmental characteristics are inferior to that of a glass lens. Therefore, particularly in the case where an aspherical lens is used for a portion as the first lens unit in which an error in fabrication greatly influences on aberrations due to the aperture, the spherical aberration is greatly affected, and a higher order flare occurs to lower contrast. As a result, the image quality is deteriorated to make it difficult to realize a projector of high definition.

In view of the foregoing, it is contemplated that a spherical lens is used for the first lens unit in order to solve the aforementioned problem. However, it has been heretofore essential to use aspherical surfaces for the first lens unit in order to realize the image quality of high definition in terms of design. Under these circumstances, a projection lens for a projector capable of correcting various aberrations in a satisfactory manner while using a spherical lens for the first lens unit has been demanded.

SUMMARY OF THE INVENTION

This invention is intended to provide a projection lens for a projector in which various aberrations can be well corrected while using a spherical lens as the first lens unit, and in which a high definition image quality as in a high quality television is obtained with relatively less number of lenses.

A projection lens for a projector according to the present invention comprises, in order from the screen side, the first lens unit including at least one positive lens and a negative lens, the positive second lens unit including at least one negative lens and a positive lens and the negative third lens unit with a concave surface having a large curvature directed at the screen side, the first lens unit merely comprising spherical lens elements, at least one of the negative lenses in the first lens unit having a concave surface having larger curvature directed at an adjacent convex surface at the object side (CRT side), the second lens unit or the third lens unit having at least one or more aspherical surfaces.

In the projector lens according to the present invention, aberrations due to the aperture are well corrected by the first lens unit including, in order from the screen side, at least one positive lens and a negative lens, chromatic aberrations including magnification is well corrected by the negative lens in the first lens unit, and at least one of the negative lenses has a concave surface having larger curvature directed at an adjacent convex surface at the opposite side of the screen to make petzval's sum of the entire system small. The second lens unit is a positive lens unit including at least one negative lens and a positive lens, the lens unit bearing a considerable portion of refracting powder of the entire system. At least one negative lens in the second lens unit makes it possible to correct the chromatic aberration in a satisfactory manner. In the third lens unit, an image surface is well corrected by a negative lens unit having a concave surface having a large curvature directed at the screen side.

Further, the first unit is composed of spherical lens elements, thereby rendering the designed performance reproducible in the practical use, and at least one aspherical surface is used for the second lens unit or the third lens unit which is close to the object, small in width of ray bundle and less sensitive to error to thereby effectively correct various aberrations.

DETAILED DESCRIPTION OF THE PREFERRED EMBODIMENTS

Figure 1:
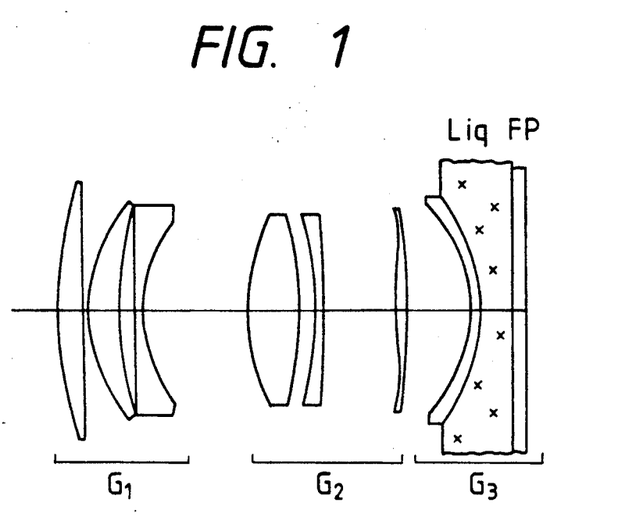
FIG. 1 is a sectional view showing the lens structure of Examples 1 to 3 and 5 of a projection lens according to the present invention.
Figure 2:
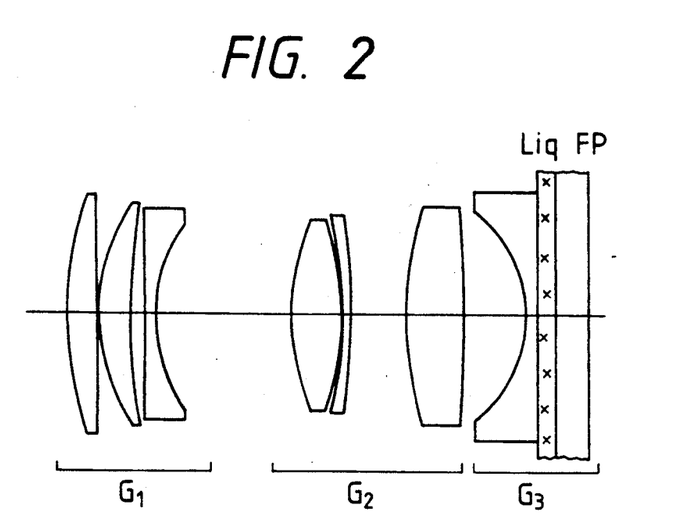
FIG. 2 is a sectional view showing the lens structure of Example 4.
Figure 3:
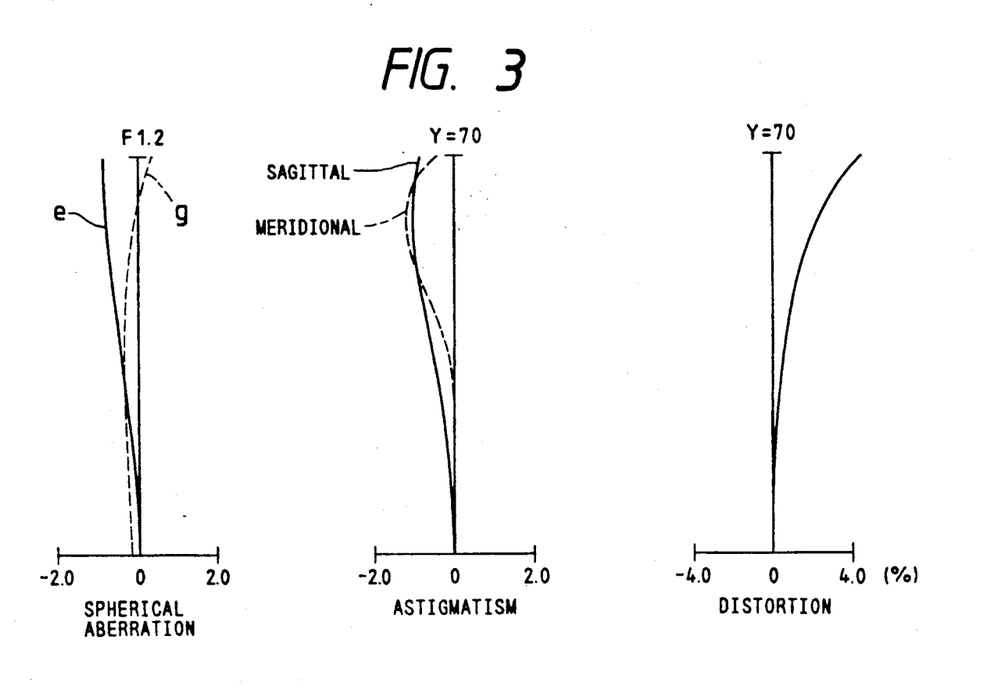
FIGS. 3 to 7 show aberrations of Examples 1 to 5, respectively.
Figure 4:
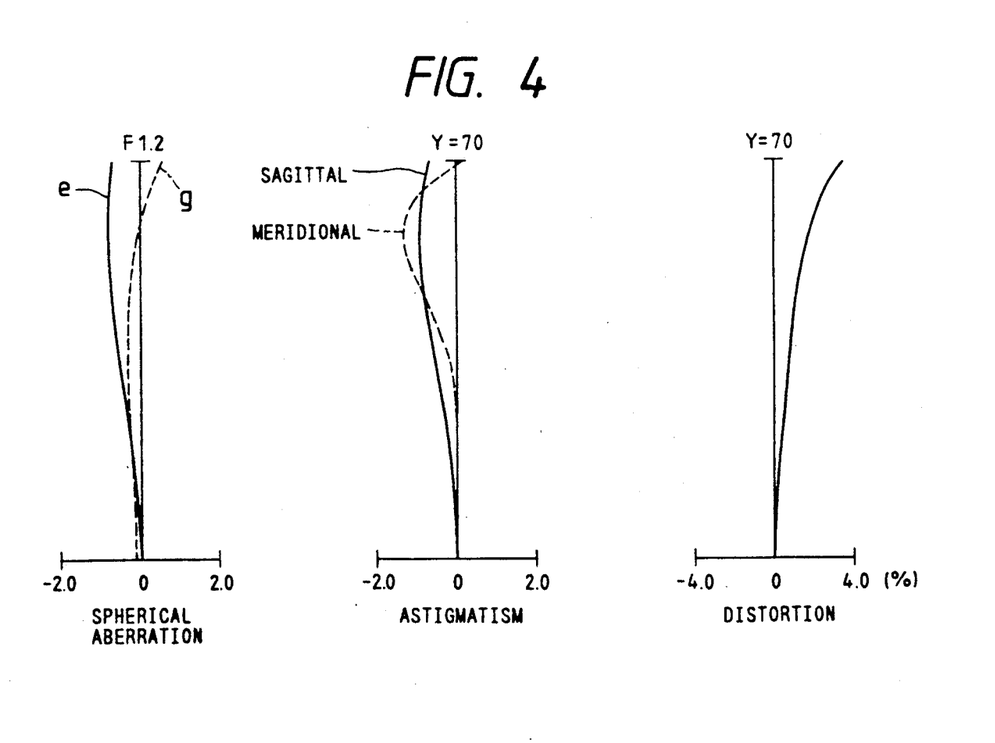
Figure 5:
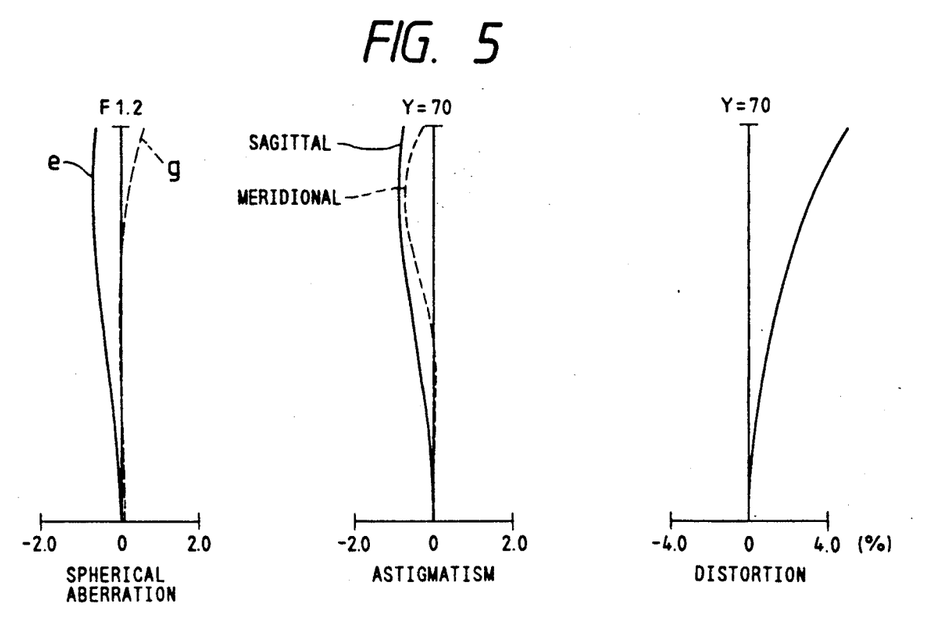
Figure 6:
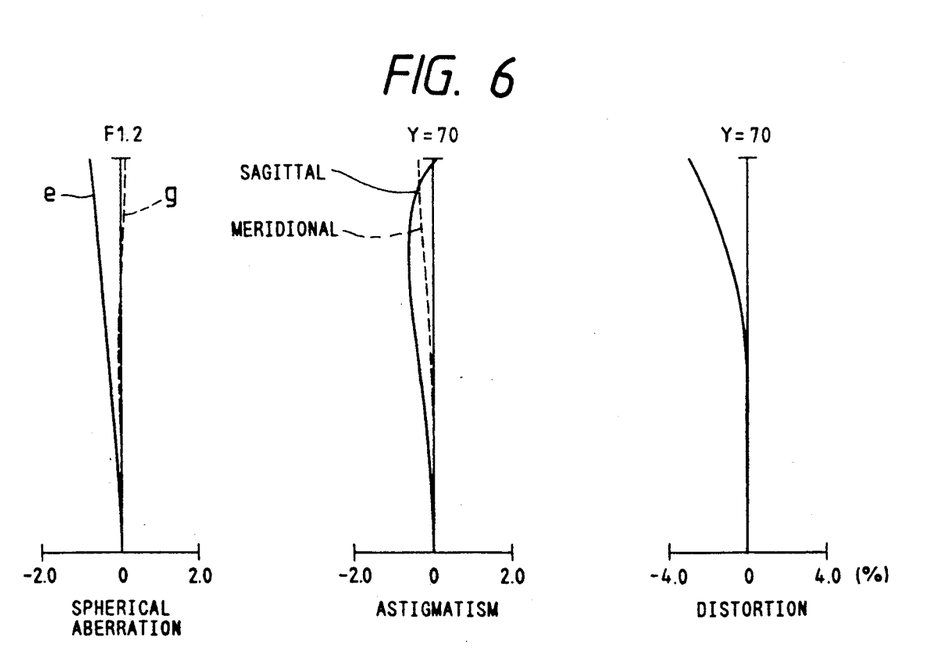
Figure 7:
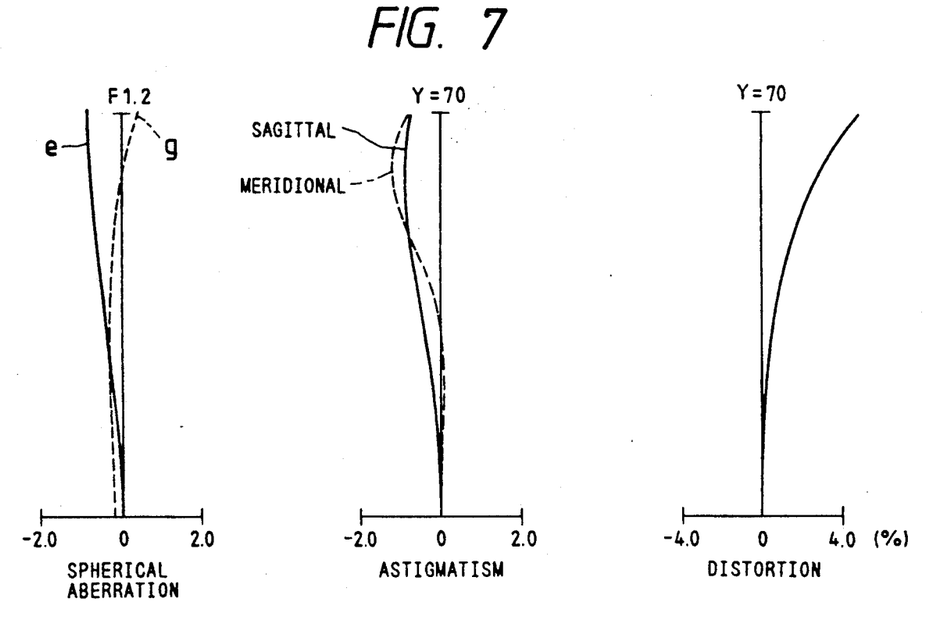

Examples of a projection lens for a projector according to the present invention will be shown hereinafter. In Examples 1 to 5 of the projector lens, the first lens unit in which all lenses are spherical elements has an arrangement including, in order from the screen side, a positive single lens, a positive meniscus single lens and a negative single lens, and the second lens unit includes a positive lens which bears a considerable refracting power of the entire system, a negative lens and a positive lens. A third lens comprises a negative lens with a foncave surface having a large curvature directed at the screen side. The second lens unit or the third lens unit has at least one aspherical surface. This projection lens comprises seven elements in total.

The projector lens according to these Examples is preferable fulfilled, as auxiliary conditions, with the following conditions:

(1) $\nu_{1-} < 40$, $\nu_{2-} < 40$ where $\nu_{1-}$: Abbe's number of a negative lens in the first lens unit $\nu_{2-}$: Abbe's number of a negative lens in the second lens unit (2) $0.7 < f/f_{2max} < 1.5$ f: Focal length of the entire system $f_{2max}$: Focal length of a positive lens having the largest refracting power in the second lens unit (3) A glass lens is used for the positive lens having the largest refracting power in the second lens unit.

(4) The second lens unit includes a plastic positive lens and a plastic negative lens.

The condition (1) is the condition relating to Abbe's number of the negative lens including in the first lens unit and the second lens unit. In order that the chromatic aberrations including the magnification may be well corrected, it is effective and desirable to fulfill this condition.

The condition (2) is the condition relating to the relationship between the focal length of the entire system and the focal length of the positive lens having the larqest refracting power in the second lens unit. When the value exceeds the upper limit, occurrence of the introvert coma increases, and when the value exceeds the lower limit, occurrence of the extrovert coma increases. Particularly in the case where the second lens unit is composed of spherical lens elements, it is desirable that this condition is fulfilled.

The condition (3) is the condition relating to lens material of the positive lens having the largest refracting power in the second lens unit. This lens can be formed from a glass lens to thereby improve the characteristic concerning temperature change of the lens in which aberrations are greatly sensitive to error.

The condition (4) is the condition relating to the positive lens and the negative lens in the second lens unit. In order to reduce cost in the second lens unit, plastic lenses are used in the case where satisfactorily maintain the temperature characteristic, a pair of a plastic positive lens and a plastic negative lens are preferably used.

In Tables of Examples given below, ri represents the radius of curvature of apex of the i-th lens surface from the screen side; di, the i-th space between lens surfaces from the screen side; ni, the refractive index of wavelength 546.07 nm (e line) (for examples 1 to 5), and wavelength 587.56 nm (d line) (for examples 6 to 8), of the i-th lens material from the screen side; and $\nu_i$, the Abbe number of the material. In the rectangular coordinates in which the apex of the surface serves as an origin and the direction of optic axis is represented by the axis X, the aspherical shape is represented by $$X = \frac{C \phi^2}{1 + \sqrt{1 - (1 + k)C^2 \phi^2}} + \Sigma A_i \phi^{Pi}$$

$$\phi = \sqrt{y^2 + z^2}$$

where C represents the curvature of the apex, K the conical constant, Ai the aspherical coefficient, and Pi($Pi > 2.0$) the exponent of the aspherical surface.

In the Tables, values of a liquid layer (Liq) and a face plate (FP) are also indicated.

EXAMPLE 1 f=136.06  Aperture ratio 1:1.2  Magnification −0.125268  Half field angle 21.75°  $f/f_{2max}$=1.3

|  |  | ri | di | ni | vi |
|---|---|---|---|---|---|
| $G_1$ | 1 | 188.804 | 13.00 | 1.72391 | 43.4 |
|  | 2 | −16170.780 | 2.20 |  |  |
|  | 3 | 80.810 | 15.28 | 1.69661 | 53.0 |
|  | 4 | 180.905 | 7.01 |  |  |
|  | 5 | 1321.456 | 4.38 | 1.73429 | 28.2 |
|  | 6 | 73.787 | 49.91 |  |  |
| $G_2$ | 7 | 95.025 | 27.00 | 1.60548 | 60.5 |
|  | 8 | −170.859 | 7.86 |  |  |
|  | 9 | −158.489 | 3.50 | 1.58975 | 30 |
|  | 10 | −519.291 | 35.97 |  |  |
|  | 11 | 370.742 | 5.00 | 1.49410 | 57 |
|  | 12 | −326.152 | 30.46 |  |  |
| $G_3$ | 13 | −60.847 | 3.50 | 1.58975 | 30 |
|  | 14 Liq | −90.000 | 15.99 | 1.41000 |  |
|  | 15 EP | ∞ | 7.00 | 1.54212 |  |
|  | 16 | ∞ |  |  |  |

| Aspherical coefficient | Exponent |
|---|---|
| 11th surface |  |
| K = 0.0 |  |
| A1 = −4.79682 × $10^{-7}$ | P1 = 4.000 |
| A2 = −1.00774 × $10^{-10}$ | P2 = 6.000 |
| A3 = −2.63511 × $10^{-15}$ | P3 = 8.000 |
| A4 = −8.40265 × $10^{-18}$ | P4 = 10.000 |
| 12th surface |  |
| K = 0.0 |  |
| A1 = −6.26348 × $10^{-8}$ | P1 = 4.000 |
| A2 = 1.21598 × $10^{-11}$ | P2 = 6.000 |
| A3 = −3.59835 × $10^{-15}$ | P3 = 8.000 |
| A4 = 8.93349 × $10^{-18}$ | P4 = 10.000 |
| 13th surface |  |
| K = −6.63848 × $10^{-1}$ |  |
| A1 = 2.91461 × $19^{-7}$ | P1 = 4.000 |
| A2 = −5.70343 × $10^{-11}$ | P2 = 6.000 |
| A3 = 6.52599 × $10^{-14}$ | P3 = 8.000 |
| A4 = −1.38890 × $10^{-17}$ | P4 = 10.000 |

EXAMPLE 2 f=136.07  Aperture ratio 1:1.2  Magnification −0.125268  Half field angle 21.92°  $f/f_{2max}$=1.26

|  |  | ri | di | ni | vi |
|---|---|---|---|---|---|
| $G_1$ | 1 | 197.713 | 13.00 | 1.72391 | 43.7 |
|  | 2 | 33089.800 | 0.98 |  |  |
|  | 3 | 82.680 | 15.28 | 1.69661 | 53.2 |
|  | 4 | 195.221 | 7.01 |  |  |
|  | 5 | 1493.969 | 4.38 | 1.73429 | 28.5 |
|  | 6 | 75.281 | 53.01 |  |  |
| $G_2$ | 7 | 96.073 | 27.00 | 1.60548 | 60.7 |
|  | 8 | −181.754 | 8.25 |  |  |
|  | 9 | −164.115 | 3.50 | 1.58975 | 30 |
|  | 10 | −430.011 | 34.95 |  |  |
|  | 11 | 407.333 | 5.00 | 1.49410 | 57 |
|  | 12 | −349.353 | 33.82 |  |  |
|  | 13 | −74.735 | 3.50 | 1.58975 | 30 |

-continued

| | | ri | di | ni | vi |
|---|---|---|---|---|---|
| $G_3$ | 14 Liq | ∞ | 15.99 | 1.41000 | |
| | 15 FP | ∞ | 7.00 | 1.54212 | |
| | 16 | ∞ | | | |

| Aspherical coefficient | Exponent |
|---|---|
| 11th surface | |
| $K = 0.0$ | |
| $A1 = -4.18903 \times 10^{-7}$ | $P1 = 4.000$ |
| $A2 = -7.38150 \times 10^{-11}$ | $P2 = 6.000$ |
| $A3 = -1.21502 \times 10^{-14}$ | $P3 = 8.000$ |
| $A4 = -9.43177 \times 10^{-18}$ | $P4 = 10.000$ |
| 12th surface | |
| $K = 0.0$ | |
| $A1 = 3.29803 \times 10^{-8}$ | $P1 = 4.000$ |
| $A2 = 1.11107 \times 10^{-11}$ | $P2 = 6.000$ |
| $A3 = 1.28598 \times 10^{-15}$ | $P3 = 8.000$ |
| $A4 = 2.31801 \times 10^{-18}$ | $P4 = 10.000$ |
| 13th surface | |
| $K = -5.42427 \times 10^{-1}$ | |
| $A1 = 5.05489 \times 10^{-8}$ | $P1 = 4.000$ |
| $A2 = 1.02948 \times 10^{-11}$ | $P3 = 6.000$ |
| $A3 = 6.56394 \times 10^{-14}$ | $P3 = 8.000$ |
| $A4 = -1.46357 \times 10^{-17}$ | $P4 = 10.000$ |

EXAMPLE 3 f=136.16  Aperture ratio 1:1.2  Magnification −0.125268 Half field angle 21.70° $f/f_{2max}=1.26$

| | | ri | di | ni | vi |
|---|---|---|---|---|---|
| $G_1$ | 1 | 180.332 | 15.00 | 1.72391 | 43.4 |
| | 2 | 879.973 | 0.30 | | |
| | 3 | 89.312 | 15.28 | 1.69661 | 53.0 |
| | 4 | 284.319 | 7.01 | | |
| | 5 | −5553.780 | 4.38 | 1.73429 | 28.2 |
| | 6 | 78.754 | 48.87 | | |
| $G_2$ | 7 | 95.133 | 27.63 | 1.60548 | 60.5 |
| | 8 | −187.531 | 7.13 | | |
| | 9 | −177.907 | 3.50 | 1.62409 | 36.0 |
| | 10 | −369.324 | 24.75 | | |
| | 11 | 595.202 | 30.00 | 1.49410 | 57 |
| | 12 | −243.032 | 28.48 | | |
| $G_3$ | 13 | −70.293 | 3.50 | 1.58975 | 30 |
| | 14 Liq | ∞ | 8.41 | | |
| | 15 FP | ∞ | 16.62 | 1.54212 | |
| | 16 | ∞ | | | |

| Aspherical coefficient | Exponent |
|---|---|
| 11th surface | |
| $K = 0.0$ | |
| $A1 = -3.59649 \times 10^{-7}$ | $P1 = 4.000$ |
| $A2 = -5.16003 \times 10^{-11}$ | $P2 = 6.000$ |
| $A3 = -6.27843 \times 10^{-15}$ | $P3 = 8.000$ |
| $A4 = -4.04854 \times 10^{-18}$ | $P4 = 10.000$ |
| 13th surface | |
| $K = -2.62660 \times 10^{-1}$ | |
| $A1 = -1.82120 \times 10^{-7}$ | $P1 = 4.000$ |
| $A2 = 3.40875 \times 10^{-11}$ | $P2 = 6.000$ |
| $A3 = 2.79964 \times 10^{-14}$ | $P3 = 8.000$ |
| $A4 = -1.46647 \times 10^{-17}$ | $P4 = 10.000$ |

EXAMPLE 4 f=136.18  Aperture ratio 1:1.2  Magnification −0.125268 Half field angle 23.18° $f/f_{2max}=1.19$

| | | ri | di | ni | vi |
|---|---|---|---|---|---|
| $G_1$ | 1 | 182.866 | 15.00 | 1.72391 | 43.4 |
| | 2 | −4414.347 | 0.41 | | |
| | 3 | 96.423 | 15.28 | 1.69661 | 53.0 |
| | 4 | 289.896 | 7.01 | | |
| | 5 | −3000.000 | 4.38 | 1.73429 | 28.2 |
| | 6 | 79.552 | 66.50 | | |
| | 7 | 117.370 | 25.44 | 1.60548 | 60.5 |

-continued

| | | ri | di | ni | vi |
|---|---|---|---|---|---|
| | 8 | −155.853 | 1.06 | | |
| $G_2$ | 9 | −166.538 | 3.68 | 1.62409 | 36.0 |
| | 10 | −347.184 | 25.92 | | |
| | 11 | 172.816 | 29.58 | 1.51825 | 63.9 |
| | 12 | −521.651 | 29.44 | | |
| $G_3$ | 13 | −59.855 | 5.32 | 1.58975 | 30 |
| | 14 Liq | ∞ | 8.41 | | |
| | 15 FP | ∞ | 16.13 | 1.54212 | |
| | 16 | ∞ | | | |

| Aspherical coefficient | Exponent |
|---|---|
| 13th surface | |
| $K = -3.31488 \times 10^{-1}$ | |
| $A1 = 8.39622 \times 10^{-8}$ | $P1 = 4.000$ |
| $A2 = 5.93244 \times 10^{-11}$ | $P2 = 6.000$ |
| $A3 = 3.13441 \times 10^{-15}$ | $P3 = 8.000$ |
| $A4 = 3.91019 \times 10^{-20}$ | $P4 = 10.000$ |

EXAMPLE 5 f=136.04  Aperture ratio 1:1.2  Magnification −0.125268 Half field angle 21.64° $f/f_{2max}=1.28$

| | | ri | di | ni | vi |
|---|---|---|---|---|---|
| $G_1$ | 1 | 189.391 | 13.00 | 1.72391 | 43.7 |
| | 2 | −8102.491 | 2.20 | | |
| | 3 | 80.810 | 15.28 | 1.69661 | 53.2 |
| | 4 | 180.905 | 7.01 | | |
| | 5 | 1321.456 | 4.38 | 1.73429 | 28.5 |
| | 6 | 73.787 | 49.91 | | |
| $G_2$ | 7 | 95.211 | 27.00 | 1.60548 | 60.7 |
| | 8 | −176.262 | 7.86 | | |
| | 9 | −170.556 | 3.50 | 1.58975 | 30 |
| | 10 | −615.824 | 35.97 | | |
| | 11 | 370.742 | 5.00 | 1.49410 | 57 |
| | 12 | −326.152 | 30.46 | | |
| $G_3$ | 13 | −60.847 | 3.50 | 1.58975 | 30 |
| | 14 Liq | −90.000 | 15.99 | 1.41000 | |
| | 15 FP | ∞ | 7.00 | 1.54212 | |
| | 16 | ∞ | | | |

| Aspherical coefficient | Exponent |
|---|---|
| 9th surface | |
| $K = -3.16000 \times 10^{-1}$ | |
| $A1 = -8.83784 \times 10^{-9}$ | $P1 = 4.000$ |
| $A2 = -2.40810 \times 10^{-13}$ | $P2 = 6.000$ |
| $A3 = -2.36390 \times 10^{-18}$ | $P3 = 8.000$ |
| $A4 = -1.09501 \times 10^{-21}$ | $P4 = 10.000$ |
| 11th surface | |
| $K = 0.0$ | |
| $A1 = -4.90017 \times 10^{-7}$ | $P1 = 4.000$ |
| $A2 = -1.00924 \times 10^{-10}$ | $P2 = 6.000$ |
| $A3 = -2.63563 \times 10^{-15}$ | $P3 = 8.000$ |
| $A4 = -8.40265 \times 10^{-18}$ | $P4 = 10.000$ |
| 12th surface | |
| $K = 0.0$ | |
| $A1 = -6.19209 \times 10^{-8}$ | $P1 = 4.000$ |
| $A2 = 1.21883 \times 10^{-11}$ | $P2 = 6.000$ |
| $A3 = -3.59893 \times 10^{-15}$ | $P3 = 8.000$ |
| $A4 = 8.93348 \times 10^{-18}$ | $P4 = 10.000$ |
| 13th surface | |
| $K = -6.63848 \times 10^{-1}$ | |
| $A1 = 2.84077 \times 10^{-7}$ | $P1 = 4.000$ |
| $A2 = -5.70865 \times 10^{-11}$ | $P2 = 6.000$ |
| $A3 = 6.52601 \times 10^{-14}$ | $P3 = 8.000$ |
| $A4 = -1.38890 \times 10^{-17}$ | $P4 = 10.000$ |

Figure 8:
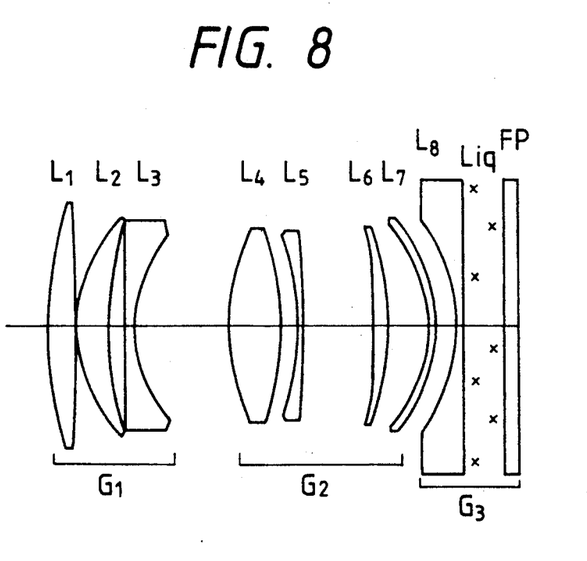
FIG. 8 is a sectional view showing the lens structure of Example 6.
Figure 9:
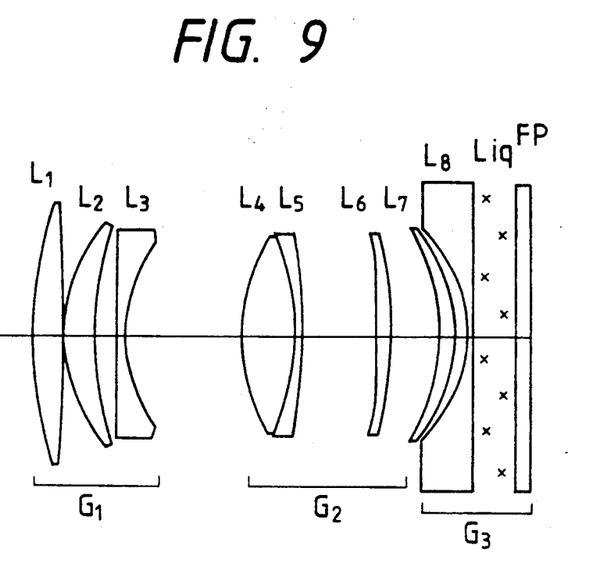
FIG. 9 is a sectional view showing the lens structure of Example 7.
Figure 10:
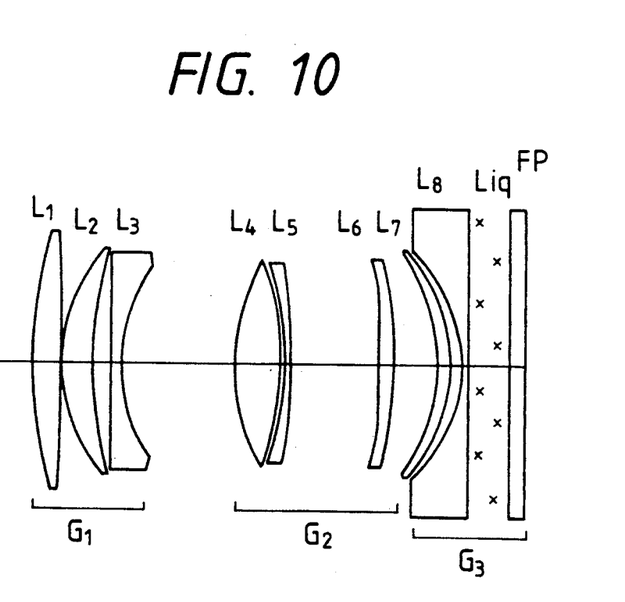
FIG. 10 is a sectional view of the lens structure of Example 8.
Figure 11:
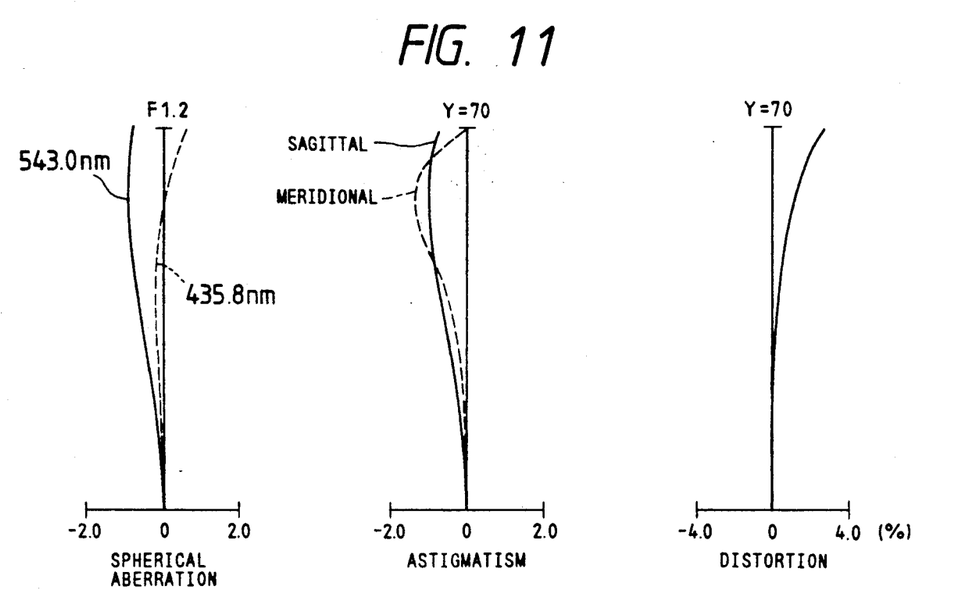
FIGS. 11 to 13 show aberrations of Examples 6 to 8, respectively.
Figure 12:
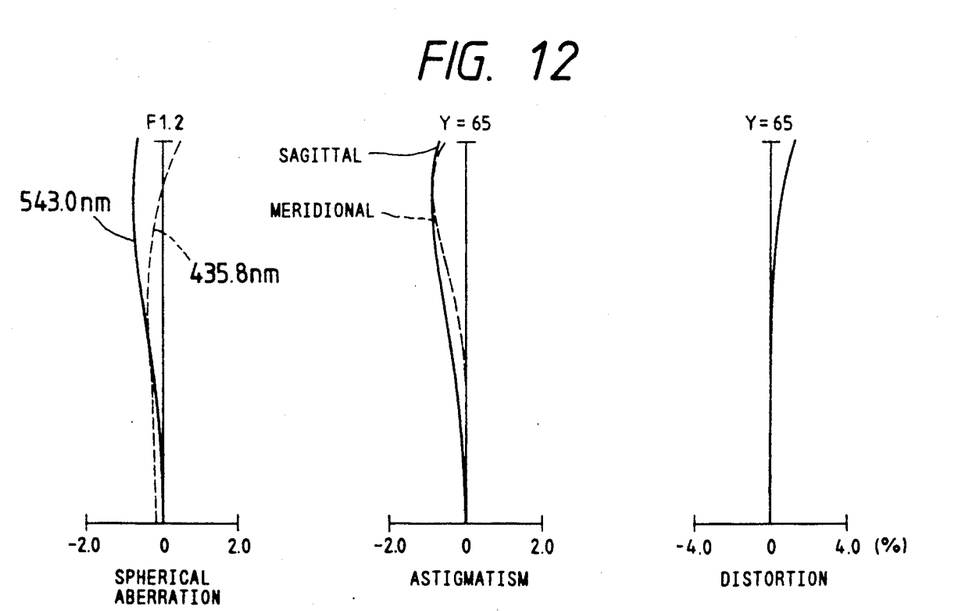
Figure 13:
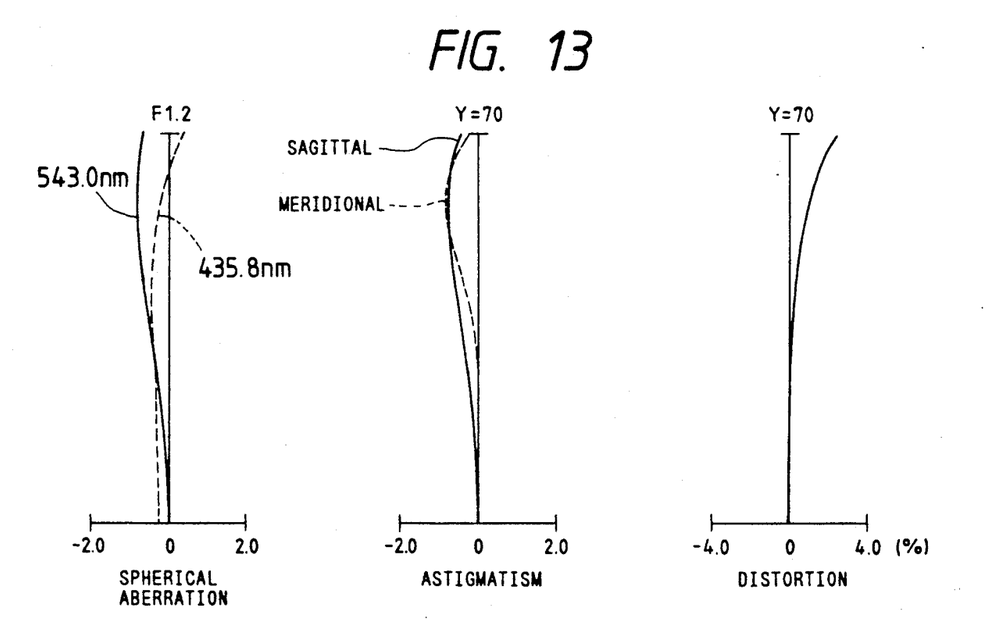

In the projection lenses for a projector shown in Examples 6 to 8, as shown in FIGS. 8 to 10, the first lens unit comprises, in order from the screen side, the positive first lens, the positive second lens and the negative third lens; the second lens unit comprises the positive fourth lens, the positive fifth lens, the positive sixth lens and the seventh lens having a small refracting power with a concave surface directed at the screen side; and the third lens unit comprises the negative eighth lens with a concave surface directed at the screen side. At least the sixth lens or the seventh lens has one or more aspheridal surfaces.

These Examples has the basic structure as described above, and are desired that as the auxiliary conditions, the following conditions are fulfilled.

(5) $\nu_1 > 45$, $\nu_3 < 40$
$0.3 < f/f_1 < 0.7$
$0.5 < f/f_2 < 0.9$
$-1.5 < f/f_3 < -1.0$ where
- $\nu_1$: Abbe's number of the first lens
- $\nu_2$: Abbe's number of the second lens
- $\nu_3$: Abbe's number of the third lens
- f: Focal length of the entire system
- $f_1$: Focal length of the first lens
- $f_2$: Focal length of the second lens
- $f_3$: Focal length of the third lens (6) $0.010 < f\left(\dfrac{1}{f_4 \cdot \nu_4} + \dfrac{1}{f_5 \cdot \nu_5}\right) < 0.020$

- $f_4$: Focal length of the fourth lens
- $f_5$: Focal length of the fifth lens
- 4: Abbe's number of the fourth lens
- 5: Abbe's number of the fifth lens (7) $0.2 \; D / f \; 0.5$
- D: On-axial air space between the third and fourth lenses
- f: Focal length of the entire system The seventh lens having a small refracting power with a concave surface directed at the screen side and the negative eighth lens are used to obtain a better image surface. Particularly, the seventh lens, in the case where the eighth lens is a spherical lens, makes it possible to obtain a good image surface not only in the case where the CRT fluorescent surface has a curvature but in the case where the fluorescent surface is flat.

The aforesaid sixth lens and seventh lens have aspherical surfaces, the former being used to correct the meridional coma mainly at a wide angle, and the latter being used to well correct the image surface.

The condition (5) is provided to enhance the practical performance and is related to the Abbe's number of the first, second and third lenses, the focal length of the entire system and the focal length of the first, second and third lenses. By fulfilling this condition, the chromatic aberrations including magnification occurring in the first and second lenses are well corrected.

The condition (6) is the condition relating to the Abbe's number and the focal length of the fourth lens and the Abbe's number and the focal length of the fifth lens, which makes it possible to well correct on-axial chromatic aberration occurring in the fifth lens having a considerable portion of the refracting power of the entire system.

The condition (7) is the condition relating to on-axial air space between the third and fourth lenses and the focal length of the entire system. When the value exceeds the lower limit of this condition, a sagital flare markedly increases, and the contrast and resolving power at a wide angle greatly lowers. When the value exceeds the upper limit, it becomes difficult to make the system compact. In the case where the field angle is widened, it becomes difficult to obtain a quantity of the margined light, making it difficult to obtain an uniform quality of image.

These Examples are specifically shown below.

The sixth lens has aspherical surfaces having an inflection point, and the seventh lens has aspherical surfaces having no inflection point. The first, second, third, fourth, fifth and eighth lenses are formed from sperical lenses, respectively.

EXAMPLE 6

Focal length f = 136.04 Half field angle 21°05'
Aperture ratio 1:1.2
Magnifying magnification 6.35 times
$f/f_1 = 0.51 \; f/f_2 = 0.75$
$f/f_3 = -1.39$ $$f\left(\frac{1}{f_4\,\nu_4} + \frac{1}{f_5\,\nu_5}\right) = 0.012$$

|    |     | r        | d     | n       | ν    |
|----|-----|----------|-------|---------|------|
| L1 | 1   | 222.410  | 13.00 |         |      |
|    |     |          |       | 1.69686 | 53.2 |
|    | 2   | -1164.460| 1.00  |         |      |
| L2 | 3   | 75.059   | 15.30 |         |      |
|    |     |          |       | 1.69686 | 53.2 |
|    | 4   | 170.733  | 8.00  |         |      |
| L3 | 5   | 1943.904 | 4.50  |         |      |
|    |     |          |       | 1.70490 | 30.1 |
|    | 6   | 66.589   | 47.55 |         |      |
| L4 | 7   | 98.372   | 27.00 |         |      |
|    |     |          |       | 1.59161 | 61.3 |
|    | 8   | -142.271 | 8.25  |         |      |
| L5 | 9   | -145.689 | 3.50  |         |      |
|    |     |          |       | 1.62443 | 36.3 |
|    | 10  | -386.033 | 35.00 |         |      |
| L6 | 11  | -7268.357| 7.00  |         |      |
|    |     |          |       | 1.49425 | 55.0 |
|    | 12  | -130.565 | 21.05 |         |      |
| L7 | 13  | -67.941  | 3.50  |         |      |
|    |     |          |       | 1.49425 | 55.0 |
|    | 14  | -91.631  | 10.00 |         |      |
| L8 | 15  | -88.576  | 3.00  |         |      |
|    |     |          |       | 1.62443 | 36.3 |
|    | 16 Liq | ∞     | 20.80 | 1.41000 |      |
| FP | 17  | ∞        |       |         |      |
|    |     |          | 7.00  | 1.54230 |      |
|    | 18  | ∞        |       |         |      |

| Aspherical coefficient | Exponent |
|---|---|
| 11th surface | |
| K = 0.0 | |
| A1 = -7.81559 × 10$^{-7}$ | P1 = 4.0000 |
| A2 = 7.02230 × 10$^{-12}$ | P2 = 6.0000 |
| A3 = -4.57050 × 10$^{-15}$ | P3 = 8.0000 |
| A4 = -1.52311 × 10$^{-18}$ | P4 = 10.0000 |
| 12th surface | |
| K = 0.0 | |
| A1 = -2.62554 × 10$^{-7}$ | P1 = 4.0000 |
| A2 = 1.07062 × 10$^{-10}$ | P2 = 6.0000 |
| A3 = 3.82736 × 10$^{-14}$ | P3 = 8.0000 |
| A4 = -2.92188 × 10$^{-18}$ | P4 = 10.0000 |
| 13th surface | |
| K = -2.71719 × 10$^{-1}$ | |
| A1 = 3.24894 × 10$^{-7}$ | P1 = 4.0000 |
| A2 = -2.84276 × 10$^{-11}$ | P2 = 6.0000 |
| A3 = 7.41442 × 10$^{-14}$ | P3 = 8.0000 |
| A4 = -2.90580 × 10$^{-17}$ | P4 = 10.0000 |
| 14th surface | |
| K = 1.31856 | |

EXAMPLE 7

Focal length f = 136.03 Half field angle 20°17'
Aperture ratio 1:1.2
Magnifying magnification 6.9 times $f/f_1 = 0.54$  $f/f_2 = 0.60$
$f/f_3 = -1.24$ $$f\left(\frac{1}{f_4 \nu_4} + \frac{1}{f_5 \nu_5}\right) = 0.013$$

|  |  | r | d | n | ν |
|---|---|---|---|---|---|
| L1 | 1 | 212.021 | 14.50 | | |
|  | | | | 1.71641 | 53.9 |
|  | 2 | −1140.618 | 1.00 | | |
| L2 | 3 | 85.305 | 15.00 | | |
|  | | | | 1.69686 | 53.2 |
|  | 4 | 173.340 | 10.50 | | |
| L3 | 5 | ∞ | 4.00 | | |
|  | | | | 1.70490 | 30.1 |
|  | 6 | 77.595 | 56.00 | | |
| L4 | 7 | 92.547 | 26.00 | | |
|  | | | | 1.59161 | 61.3 |
|  | 8 | −121.600 | 3.50 | | |
| L5 | | | | 1.62443 | 36.3 |
|  | 9 | −274.568 | 35.80 | | |
| L6 | 10 | 1151.150 | 6.50 | | |
|  | | | | 1.49425 | 55.0 |
|  | 11 | −233.153 | 23.73 | | |
| L7 | 12 | −95.121 | 7.00 | | |
|  | | | | 1.49425 | 55.0 |
|  | 13 | −100.986 | 6.50 | | |
| L8 | 14 | −71.996 | 3.20 | | |
|  | | | | 1.62443 | 36.3 |
|  | 15 Liq | ∞ | 20.80 | 1.41000 | |
| FP | 16 | ∞ | | | |
|  | | | 7.00 | 1.54230 | |
|  | 17 | ∞ | | | |

| Aspherical coefficient | Exponent |
|---|---|
| 10th surface | |
| K = 0.0 | |
| A1 = −7.35810 × 10⁻⁷ | P1 = 4.0000 |
| A2 = −3.65500 × 10⁻¹¹ | P2 = 6.0000 |
| A3 = 9.84940 × 10⁻¹⁵ | P3 = 8.0000 |
| A4 = −1.61460 × 10⁻¹⁸ | P4 = 10.0000 |
| 11th surface | |
| K = 0.0 | |
| A1 = −2.33970 × 10⁻⁷ | P1 = 4.0000 |
| A2 = 4.30220 × 10⁻¹¹ | P2 = 6.0000 |
| A3 = 5.17890 × 10⁻¹⁴ | P3 = 8.0000 |
| A4 = −3.65070 × 10⁻¹⁸ | P4 = 10.0000 |
| 12th surface | |
| K = 4.01540 × 10⁻¹ | |
| A1 = 2.71610 × 10⁻⁷ | P1 = 4.0000 |
| A2 = −4.94340 × 10⁻¹¹ | P2 = 6.0000 |
| A3 = 7.71990 × 10⁻¹⁴ | P3 = 8.0000 |
| A4 = −2.70880 × 10⁻¹⁷ | P4 = 10.0000 |
| 13th surface | |
| K = 1.70500 | |
| A1 = −8.79020 × 10⁻⁸ | P1 = 4.0000 |
| A2 = −1.32130 × 10⁻¹¹ | P2 = 6.0000 |
| A3 = 1.34030 × 10⁻¹⁵ | P3 = 8.0000 |
| A4 = 8.36760 × 10⁻²⁰ | P4 = 10.0000 |

EXAMPLE 8

Focal length f = 136.01 Half field angle 20°54′
Aperture ratio 1:1.2
Magnifying magnification 6.35 times
$f/f_1 = 0.56$  $f/f_2 = 0.64$
$f/f_3 = -1.25$ $$f\left(\frac{1}{f_4 \nu_4} + \frac{1}{f_5 \nu_5}\right) = 0.013$$

|  |  | r | d | n | ν |
|---|---|---|---|---|---|
| L1 | 1 | 192.317 | 14.00 | | |
|  | | | | 1.71641 | 53.9 |
|  | 2 | −1893.531 | 1.00 | | |
| L2 | 3 | 82.736 | 15.00 | | |
|  | | | | 1.69686 | 53.2 |
|  | 4 | 174.442 | 8.50 | | |
| L3 | 5 | 2117.169 | 4.50 | | |
|  | | | | 1.70490 | 30.1 |
|  | 6 | 74.059 | 56.00 | | |
| L4 | 7 | 96.682 | 23.00 | | |
|  | | | | 1.59161 | 61.3 |
|  | 8 | −136.337 | 1.20 | | |
| L5 | 9 | −134.911 | 3.50 | | |
|  | | | | 1.62443 | 36.3 |
|  | 10 | −284.008 | 42.26 | | |
| L6 | 11 | 3693.241 | 7.00 | | |
|  | | | | 1.49425 | 55.0 |
|  | 12 | −186.460 | 20.49 | | |
| L7 | 13 | −78.200 | 7.00 | | |
|  | | | | 1.49425 | 55.0 |
|  | 14 | −85.410 | 5.00 | | |
| L8 | 15 | −71.409 | 3.00 | | |
|  | | | | 1.62443 | 36.3 |
|  | 16 Liq | ∞ | 20.80 | 1.41000 | |
| FP | 17 FP | ∞ | | | |
|  | | | 7.00 | 1.54230 | |
|  | 18 | ∞ | | | |

| Aspherical coefficient | Exponent |
|---|---|
| 11th surface | |
| K = 0.0 | |
| A1 = −8.06844 × 10⁻⁷ | P1 = 4.0000 |
| A2 = −3.87241 × 10⁻¹³ | P2 = 6.0000 |
| A3 = −3.18224 × 10⁻¹⁵ | P3 = 8.0000 |
| A4 = −1.51116 × 10⁻¹⁸ | P4 = 10.0000 |
| 12th surface | |
| K = 0.0 | |
| A1 = −2.96426 × 10⁻⁷ | P1 = 4.0000 |
| A2 = 1.03691 × 10⁻¹⁰ | P2 = 6.0000 |
| A3 = 3.70839 × 10⁻¹⁴ | P3 = 8.0000 |
| A4 = −2.93265 × 10⁻¹⁸ | P4 = 10.0000 |
| 13th surface | |
| K = −3.97428 × 10⁻¹ | |
| A1 = 3.29946 × 10⁻⁷ | P1 = 4.0000 |
| A2 = −4.53491 × 10⁻¹¹ | P2 = 6.0000 |
| A3 = 7.43436 × 10⁻¹⁴ | P3 = 8.0000 |
| A4 = −2.90521 × 10⁻¹⁷ | P4 = 10.0000 |
| 14th surface | |
| K = 1.12002 | |

The present invention provides a projection lens for a projector in which the image forming performance is excellent and which can obtain an image quality of high definition as in a high quality television with a relatively simple construction despite the fact that the aperture ratio is large, about 1.2, and the half field angle is wide, about 21° as shown in the Examples and various aberration diagrams.

What is claimed is:

1. A projection lens for a projector comprising, in order from the screen side, a positive first lens unit including at least one positive lens and at least one negative lens, a positive second lens unit including at least one positive lens and at least one negative lens, and a negative third lens unit with a concave surface having a large curvature directed at the screen side, characterized in that said first lens unit comprises spherical lens elements, the at least one negative lens in the first lens unit having a concave surface having a larger curvature than said large curvature of said third lens unit, said larger curvature being directed at an adjacent convex surface farther from the screen, and the second lens unit and the third lens unit together having at least one or more aspherical surfaces.

2. The projection lens for a projector according to claim 1, wherein the positive lens having the largest refracting power in said second lens unit comprises a glass lens.

3. The projection lens for a projector according to claim 1, wherein the second lens unit includes a plastic positive lens and a plastic negative lens.

4. The projection lens for a projector according to claim 1, wherein the combination of lens units satisfies the conditions below:

$\nu_{1-} < 40, \nu_{2-} < 40$ where $\nu_{1-}$: Abbe's number of a negative lens in the first lens unit $\nu_{2-}$: Abbe's number of a negative lens in the second lens unit.

5. The projection lens for a projector according to claim 1, wherein the combination of lens units satisfies the condition below:

$0.7 < f/f_{2max} < 1.5$ where f: Focal length of the entire system $f_{2max}$: Focal length of the positive lens having the largest refracting power in the second lens unit.

6. The projection lens for a projector according to claim 1, wherein the combination of lens units satisfies the conditions below:

$\nu_1 < 45, \nu_2 > 45, \nu_3 > 40$ $0.3 - f/f_1 < 0.7$ $0.5 < f/f_2 < 0.9$ $-1.5 < f/f_3 < -1.0$ where $\nu_i$: Abbe's number of the i-th lens f: Focal length of the entire system $f_i$: Focal length of the i-th lens.

7. The projection lens for a projector according to claim 1, wherein said positive second lens unit is composed of a positive fourth lens, a seventh lens having a small refracting power with a concave surface directed at the screen side, the sixth lens and the seventh lens together having one or more aspherical surfaces.

8. The projection lens for a projector according to claim 1, wherein the lens satisfies the condition below:

$$0.010 < f\left(\frac{1}{f_4 \cdot \nu_4} + \frac{1}{f_5 \cdot \nu_5}\right) < 0.020$$

where $f_4$: Focal length of the fourth lens $f_5$: Focal length of the fifth lens $\nu_4$: Abbe's number of the fourth lens $\nu_5$: Abbe's number of the fifth lens.

9. The projection lens for a projector according to claim 1, wherein the combination of lens units satisfies the condition below:

$0.2 < D/f - 0.5$ where

D: On-axial air space between the thirds and fourth lenses f: Focal length of the entire system.

* * * * *

UNITED STATES PATENT AND TRADEMARK OFFICE
CERTIFICATE OF CORRECTION

Page 1 of 2

PATENT NO. : 5,015,076
DATED : May 14, 1991
INVENTOR(S) : Kiichirou Ueda

It is certified that error appears in the above-indentified patent and that said Letters Patent is hereby corrected as shown below:

On the Title page, item [54], Title, change "LEWS" to --LENS--;
On the Title page, under item [56], Foreign Patent Documents, insert--
Attorney, Agent, or Firm - Finnegan, Henderson, Farabow, Garrett & Dunner--;
On the Title page, item [57], Abstract, col. 2, Line 15, after "surface" change "is" to --in--;

Claim 6, Column 11, Line 26, change "$V_1<45$" to --$V_1>45$--;

Claim 6, Column 11, Line 26, change "$V_3>40$" to --$V_3<40$--;

Claim 6, Column 11, Line 27, change "$0.3-f/f_1$" to --$0.3<f/f_1$--;

Claim 7, Column 12, Line 6, after "fourth lens," insert -- a negative fifth lens, a positive sixth lens, and --;

Claim 9, Column 12, Line 25, change "$D/f-0.5$" to --$D/f<0.5$--;

UNITED STATES PATENT AND TRADEMARK OFFICE
CERTIFICATE OF CORRECTION

PATENT NO. : 5,015,076
DATED : May 14, 1991
INVENTOR(S) : Kiichirou Ueda

It is certified that error appears in the above-indentified patent and that said Letters Patent is hereby corrected as shown below:

Claim 9, Column 12, Line 27, change "thirds" to --third--.

Signed and Sealed this

Seventh Day of June, 1994

Attest:

BRUCE LEHMAN

*Attesting Officer*   *Commissioner of Patents and Trademarks*